2,783,131

VAPOR PHASE PREPARATION OF CYANAMIDE FROM CYANIC ACID

Johnstone S. Mackay, Pittsburgh, Pa., and Leslie G. Boatright, Stamford, Conn., assignors to American Cyanamid Company, New York, N. Y., a corporation of Maine No Drawing. Application September 18, 1953, Serial No. 381,133

3 Claims. (Cl. 23—190)

The present invention concerns the preparation of cyanamide.

It has been found that when cyanic acid vapor (HOCN or its tautomer HNCO) is heated in content with an inert, inorganic heat-stable highly porous adsorbent of high surface area such as silica gel, at a temperature of at least 450° C., a reaction mass is formed containing cyanamide.

$$2HNCO \rightarrow H_2NCN + CO_2$$

The cyanamide is formed on the surface of the adsorbent, from which it may be recovered by means well known to those skilled in the art. A preferred method of recovering the cyanamide is to leach the absorbent mass with water.

The following example illustrates the invention:

EXAMPLE 1

A quartz reaction tube 20″ long by ¾″ inner diameter equipped at the top and bottom with vapor inlet and exit ports respectively was placed in a vertical electric furnace. About 75 g. of silica gel dried in an oven at 100° C. overnight was positioned in about the center of the tube. The furnace was brought up to a temperature of 575° C. and then a stream of cyanic acid vapor (from decomposed cyanuric acid) was fed into the vapor inlet port. Three hours was required to feed 6 g. of cyanic acid vapor to the silica gel. The reaction mass was then removed and leached with 500 ml. of water to recover the cyanamide as an aqueous solution. The cyanamide yield was 0.98 g. or 33% of theory.

The adsorbent

It has been found that virtually any inert absorptive material of high internal surface area and/or volume can be utilized in the conversion of cyanic acid vapor to cyanamide. The action appears to be predominantly physical, and is apparently induced best by materials of high surface area in which a considerable amount of the surface is actually in the form of the walls of innumerable submicroscopic capillaries. The activated oxide gels of the amphoteric elements qualify admirably in this respect. For example, it is well known how to prepare gels of silica and alumina such that the internal volume of a given particle is considerably more than half the apparent volume of the particle. The same techniques have been widely utilized in the past for preparing activated gels of titania, zirconia, thoria, and the like. There are also many naturally occurring adsorbents available commercially in activated form that have been found suitable. These include pumice diatomite, infusorial earth, and the like, which inherently possess the desired amorphous silica structure and can therefore be activated by reduction of the water content down to 5–10%. Others, such as the clays and clay-like materials, e. g., kaolin, bentonite, bauxite, and fuller's earth, are customarily activated by an acid wash prior to thermal dehydration, thereby depositing in situ on each flake or particle of material a layer of silica and/or alumina gel.

The structures of gels of silica, silica-alumina and the like can be varied by various pre-treatments to give materials having predominantly pores of a large size or any intermediate diameter from 60 to 70 A to very low values. Also, the gels in question can have surface areas covering the range of 180–650 m.$^2$/g. Gels having specific surfaces of 600 m.$^2$/g. and pore volumes of 0.9 cc./g. have been found satisfactory as have gels having surfaces of 450 m.$^2$/g. and pore volumes of 0.26 cc/g. These are not to be construed as limits of workability of the gel but only as examples of the variations in structure possible.

As normally activated, the catalysts may carry 2–20% by weight of adsorbed water. It is neither necessary nor desirable to remove all of this water (as by preliminary strong heating). In fact, heating silica gel overnight in a muffle furnace at 600° C. will ordinarily remove ½ to ⅔ of its adsorbed water. However, whatever water is not removed by preliminary heating is eventually nearly all removed by hydrolysis: e. g., $$HNC + H_2O \rightarrow NH_3 + CO_2$$

While a silica gel was used in the preceding example, it is to be understood that this is but representative of the general class of inert, inorganic, heat-stable, porous, adsorbent materials described as suitable in this section.

The temperature may be varied to prepare predominantly either melamine or cyanamide. Within the range 220°–400° C. the main product is melamine, with a minor amount of cyanamide. Above 400° C. the melamine begins to "crack" or decompose on the silica gel to cyanamide, and if cyanamide is the product desired, the reaction temperature should be at least 450°–650° C., or even higher. Cyanamide adheres tenaciously to the gel surface even at red heat, but may readily be recovered from the cooled gel by leaching with water or other known cyanamide solvent.

Operation is not limited to atmospheric pressure. Sub- or superatmospheric pressures may also be used.

I claim:

1. The method of preparing a cyanamide-containing mass which comprises: heating cyanic acid vapor, bringing said heated cyanic acid vapor into reactive contact with a silica gel at a temperature of at least 450° C., whereby cyanamide is formed on the silica gel leaching the resultant mass with water and recovering cyanamide from resultant solution.

2. The method of preparing cyanamide which comprises heating a silica gel to a temperature in the range of from at least 450° C. to about 650° C., bringing into reactive contact therewith heated cyanic acid vapor, leaching the resultant cyanamide-containing mass with water, whereby an aqueous solution of cyanamide is obtained, and recovering cyanamide from said solution.

3. The method of preparing a cyanamide-containing mass which comprises heating cyanuric acid to provide a heated vapor containing cyanic acid, subjecting the said vapor at substantially atmospheric pressure to contact with a silica gel at a temperature of from at least 450° C. to about 650° C., leaching the resultant cyanamide-containing mass with water and recovering cyanamide from resultant solution.

References Cited in the file of this patent

UNITED STATES PATENTS

| | | |
|---|---|---|
| 1,622,731 | Muckenfuss | Mar. 29, 1927 |
| 1,741,674 | Barsky | Dec. 31, 1929 |
| 2,656,253 | Mackay | Oct. 20, 1953 |
| 2,721,786 | Boatright et al. | Oct. 25, 1955 |

FOREIGN PATENTS

"An Outline of Organic Chemistry" by Degering (College Outline Series), 1941 ed., page 155. Barnes and Noble, Inc., N. Y.

"The Chemistry of Cyanogen Compounds" by H. E. Williams, 1915 ed. (J. and A. Churchill, London, publishers), pages 17, 18, 171, 172, 179.

Thorpe's Dictionary of Applied Chemistry, fourth ed., 1939, vol. 3, pages 506 and 507. Longmans, Green and Company; N. Y.